United States Patent
Woo

(10) Patent No.: US 6,370,123 B1
(45) Date of Patent: *Apr. 9, 2002

(54) METHOD AND SYSTEM FOR HALF-DUPLEX WIRELESS COMMUNICATION

(75) Inventor: Thomas Yat Chung Woo, Red Bank, NJ (US)

(73) Assignee: Lucent Technologies, Inc., Murray Hill, NJ (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/010,076

(22) Filed: Jan. 21, 1998

(51) Int. Cl.$^7$ ................................................. H04L 5/16
(52) U.S. Cl. ........................ 370/278; 370/236; 370/462; 455/422; 375/220
(58) Field of Search ................................ 370/229, 236, 370/346, 347, 349, 445, 462, 311, 278; 455/524, 422; 725/81; 375/220, 222

(56) References Cited

U.S. PATENT DOCUMENTS

| | | | |
|---|---|---|---|
| 4,161,786 A | | 7/1979 | Hopkins et al. ............... 710/45 |
| 4,491,947 A | | 1/1985 | Frank .......................... 370/323 |
| 4,841,527 A | | 6/1989 | Raychaudhuri et al. ..... 714/748 |
| 4,987,571 A | | 1/1991 | Haymond et al. ........... 370/445 |
| 5,297,144 A | * | 3/1994 | Gilbert et al. ............... 370/346 |
| 5,371,734 A | * | 12/1994 | Fischer ........................ 370/311 |
| 5,473,604 A | * | 12/1995 | Lorenz et al. ............... 370/229 |
| 5,677,909 A | * | 10/1997 | Heide .......................... 370/347 |
| 5,721,725 A | * | 2/1998 | Want et al. .................. 370/236 |
| 5,732,077 A | * | 3/1998 | Whitehead ................... 370/349 |
| 5,862,452 A | * | 1/1999 | Cudak et al. ................. 725/81 |
| 6,246,693 B1 | * | 6/2001 | Davidson et al. ........... 370/445 |

FOREIGN PATENT DOCUMENTS

| | | |
|---|---|---|
| EP | 0 134 544 | 3/1984 |
| EP | 0 523 362 | 6/1992 |

OTHER PUBLICATIONS

European Search Report on Application No. EP 99 30 0171, 2.11.00, English Abstract of EP 99 30 0171, European Search Report on Application No. 92 10 9327, English Abstract of Publication No. 0 523 362 A3.

An Experimental Testbed for a Direct Sequence Spread Spectrum Local Area Network, A. Marshall, C.T. Spracklen, C. Smythe, Second IEE National Conference on Telecommunications Apr. 2–5, 1989.

A Comparison of CDMA and NPCSMA For An Indoor Data Network, C. Sandeep, S.C. Gupta, 39$^{th}$ IEEE Vehicular Technology Conference vol. II May 1–3, 1989.

European Search Report on EP 0 932 276 A3, Dec. 12, 2000, English Abstract on EP 0 932 276 A3.

* cited by examiner

Primary Examiner—Hassan Kizou
Assistant Examiner—John Pezzlo
(74) Attorney, Agent, or Firm—Morgan & Finnegan, LLP

(57) ABSTRACT

The present invention is a method and system of half-duplex wireless communication where a premises has a base station that services a defined communication cell. The base station transmits and receives Request to Send and Clear to Send announcements to and from mobile stations to indicate that the base station can send and receive data. A plurality of mobile stations send and receive data after transmitting and receiving Clear to Send and Request to Send announcements to and from the base station based on the respective time period in which the base station has received the Clear to Send and Request to Send announcements from respective mobile stations.

5 Claims, 3 Drawing Sheets

METHOD AND SYSTEM FOR HALF-DUPLEX WIRELESS COMMUNICATION

FIELD OF THE INVENTION

This invention is related to a method and system of half-duplex wireless messaging or communication that minimizes collision of messages among the mobile stations to and from a base station.

BACKGROUND OF THE INVENTION

Wireless messaging and communication systems would be advantageous for use in offices, large premises and other similar locations. Such wireless messaging and communication systems would facilitate installation because hard-wired systems would not be necessary as is common with many types of LAN and e-mail systems. A wireless messaging and communication system can also be connected almost anywhere within the office or premises.

It would be advantageous if an indoor, premises based wireless communication system could be implemented that would allow messaging among various users in the premises or office. Preferably, such communication or messaging system would be inexpensive compared to LAN based systems and would use minimal power and operate at a minimal cost.

SUMMARY OF THE INVENTION

In accordance with the present invention, a wireless communication and messaging system is a half-duplex system where a premises has a base station that services a defined communication cell such as an office space. The base station transmits and receives Request to Send and Clear to Send announcements to and from mobile stations to indicate that the base station can send and receive data such as messages to and from the mobile stations. A plurality of mobile stations send and receive data after transmitting and receiving Request to Send and Clear to Send announcements to and from the base station based on the respective time period that the base station received the Request to Send and Clear to Send announcements from respective mobile stations.

In accordance with one aspect of the present invention, the base station transmits to a plurality of mobile stations contained within one wireless communication cell a READY announcement indicating that the base station is ready to receive data on an uplink channel from the mobile stations. A random initial backoff time is set for each mobile station. A Request to Send announcement is then transmitted from each mobile station to the base station following expiration of the backoff time period. The base station then transmits to the mobile stations a Clear to Send announcement indicating that a first mobile station had its Request to Send announcement received in the base station before the other mobile stations and that first mobile station can now transmit data. That mobile station then transmits its data. The other mobile stations then resubmit their Request to Send announcements after a predetermined backoff time period has expired. That backoff time period corresponds to a time period in which the first mobile station can transmit its data to the base station.

The downlink protocol for sending messages from the base station to a mobile station is less complex than that uplink protocol for sending messages from the mobile stations to the base station. The base station will send a Request To Send to the mobile stations. Then, the base station will wait for the Clear To Send and then begin sending.

DESCRIPTION OF THE DRAWING

The foregoing and other features and advantages of the present invention will be appreciated more fully from the following description, with reference to the accompanying drawings in which.

DETAILED DESCRIPTION OF THE INVENTION

Figure 1:
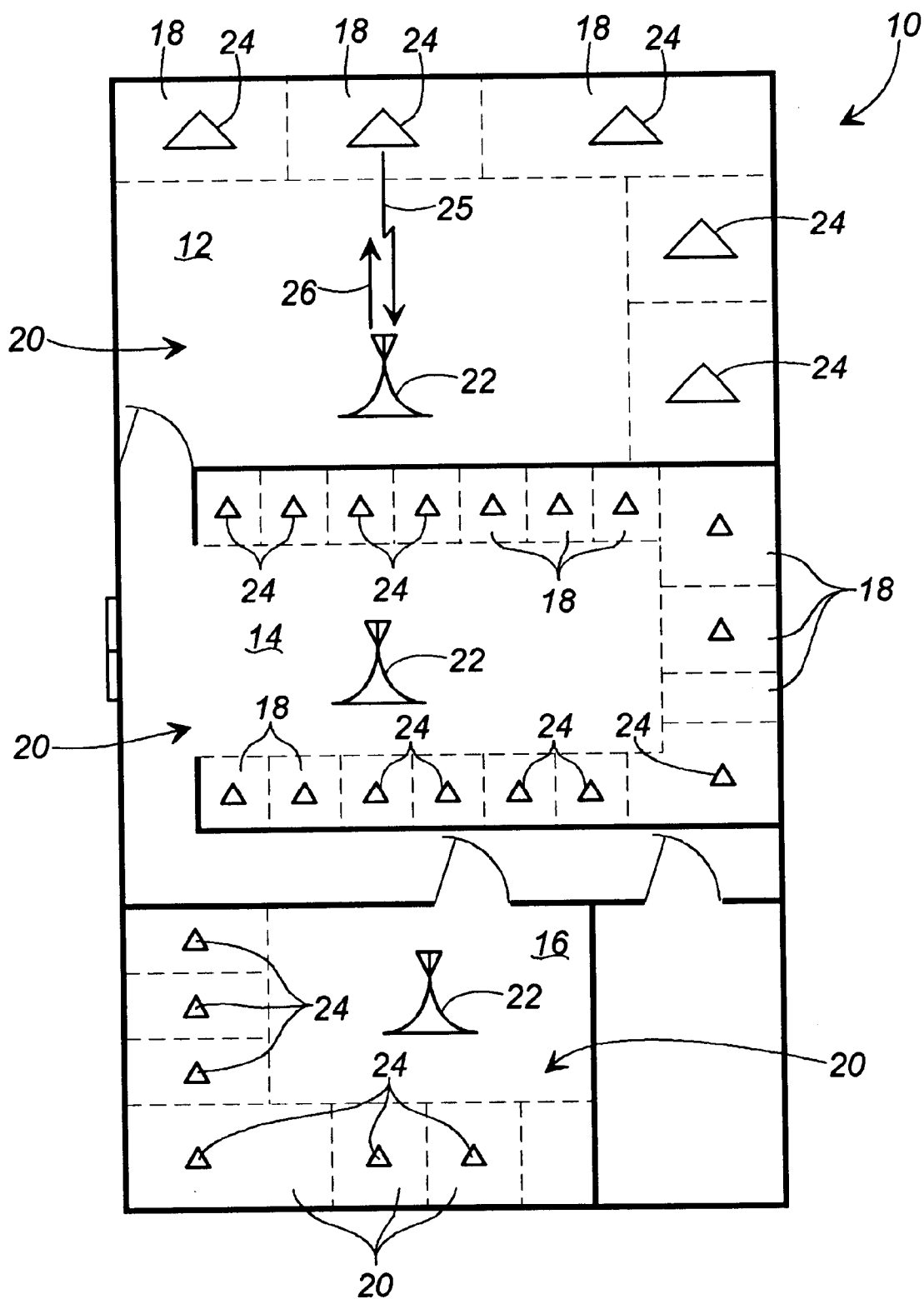
FIG. 1 is a schematic view of a premises showing a series of large office spaces with each space comprising a separate cellular system having a base station and a plurality of mobile stations.

Referring now to FIG. 1, there is illustrated a premises comprising a large office complex at 10 having separate large office spaces 12, 14 and 16. Each office space 12, 14 and 16 includes individual offices 18. The two-way messaging system in accordance with the present invention is illustrated at 20 and used with each office space 12, 14, and 16. The system 20 is cellular-based and includes a base station 22 and mobile stations 24 that each use a half-duplex hardware. Thus, a mobile station 24 and a base station 22 cannot transmit and receive at the same time. Such half-duplex hardware used in the present invention can be constructed for a particular application by one skilled in the art.

When data (messages) is sent on both uplink channel 25 and downlink channel 26 directions, a priority resolution is required. In the present method and system of the invention, priority is given to the mobile stations 24. Mobile stations 24 typically are less powerful in terms of resources such as storage and battery power and may not be able to defer transmission. In addition, by the nature of the mobile stations, they do not stay on all the time and thus should be permitted to transmit their data as soon as possible. Base stations 22 typically have more power and greater storage capacity.

As illustrated, this system is also cellular-based and uses two distinct frequencies, one for the downlink and the other for the uplink in each cell. Each cell is covered by a single base station 22 and typically can be the size of an office space having several individual offices 18 or work areas. Naturally, the co-channel interference from neighboring cells is small and is not considered. The system is designed for an indoor setting with symmetric forward and reverse channel bandwidth. Because the radio hardware is half-duplex, the radio unit is either in a receive or transmit mode. When it is in a receive mode, it cannot transmit and vice versa for the transmit mode. Thus, the method and system of the present invention ensures that the destination radio unit is in receive mode before sending a data packet to it. Otherwise, the data packet will be dropped. One major application of the present invention is messaging. Thus, performance requirements (e.g., bandwidth and delay) are less stringent than the two-way interactive applications. A simple random access scheme suffices for the uplink channel. Communication within a cell is always to and from the base station 22. There is no direct peer communication between two mobile stations in the same cell. Any software required in the mobile stations 24 can be contained in software or firmware of the devices. The base station 22 and mobile stations 24 have appropriate hardware and timers for operating as described below.

In accordance with the present invention, a media access protocol for the invention is described and consists of two halves: the mobile station-side and the base station-side. The mobile station-side protocol is executed by all mobile stations, while the base station-side protocol is executed by the base station. The two halves cooperate to coordinate access to the channel resources (i.e., the broadcast air medium) of the cell defined by the particular office space 12, 14 or 16. A mobile station 24 can be assigned to a user who can freely move between offices 18.

The downlink channel is single access and the base station is the only sender on this channel. The uplink channel is multiple access and it is shared by all mobile stations in a cell. Collision is possible and is addressed by the protocol of the present invention.

Because collision detection is not feasible in a wireless environment, a collision avoidance approach is used in accordance with the present invention. When a base station 22 is ready to accept data, it announces its availability on the downlink channel 26. Upon receiving the "ready" announcement, mobile stations 24 that have data to send submit their transmission requests on the uplink channel 25. The base station 22 grants the first transmission it receives, and announces the result on the downlink channel. Any mobile stations 24 whose transmission requests were not accepted backoff for the duration of the accepted transmission, and re-submit their requests following the backoff.

Figure 2:
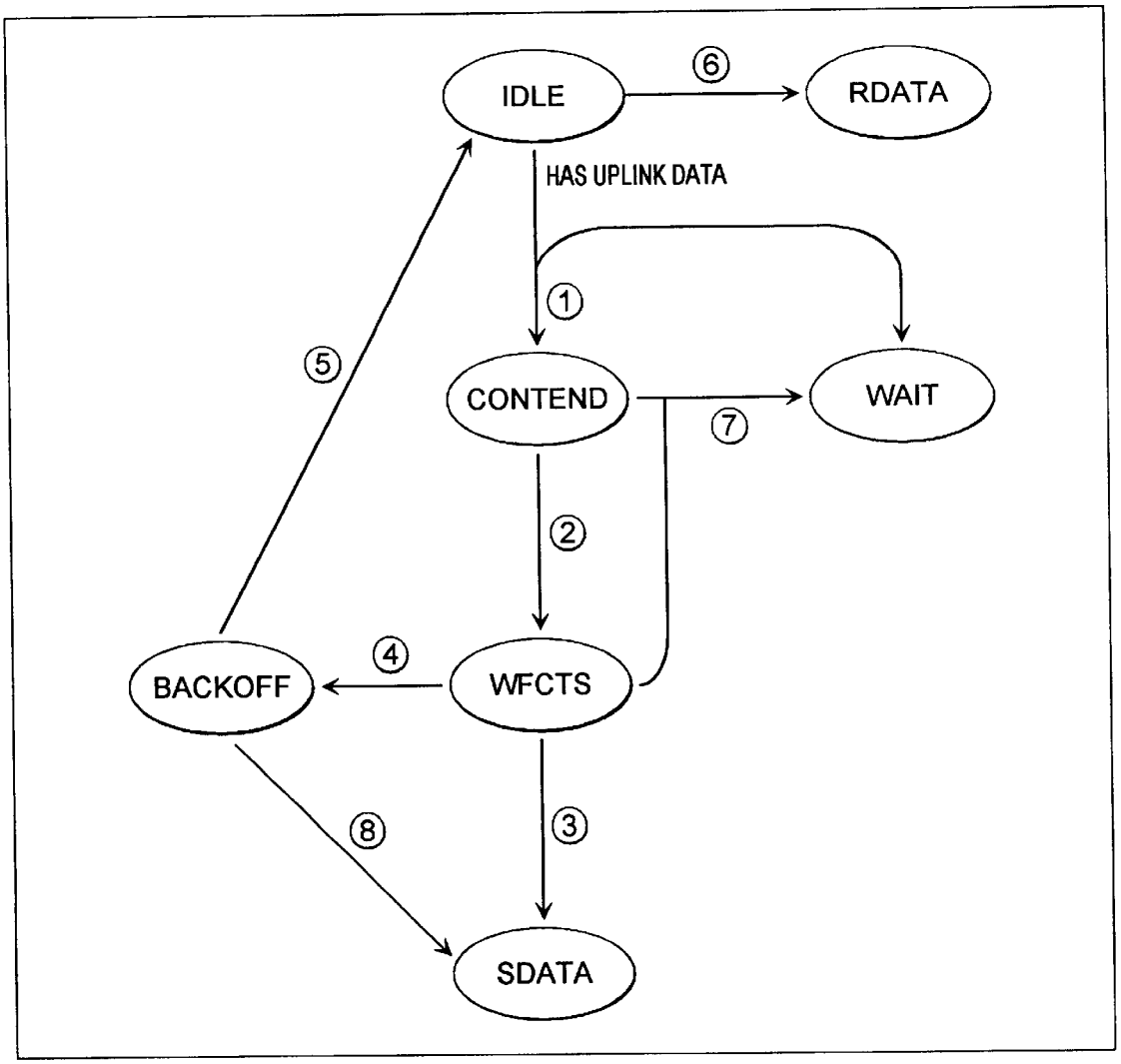
FIG. 2 shows a state diagram for the operation of the mobile station in accordance with the present invention.

FIG. 2 illustrates a state diagram for the mobile station-side protocol. Table 1 gives a description of the actions associated with the state transitions of FIG. 2.

The various labels in Table 1 correspond to the numeric indices between the various states as shown in FIG. 2.

TABLE 1

Mobile Station-Side Protocol Transitions

| Label | Actions |
|---|---|
| 1 | a. receive READY |
|   | b. set IB timer = random (RW) |
| 2 | a. IB timer timeout |
|   | b. send RTS A,n |
|   | c. set CTS timer |
| 3 | a. receive CTS A,n' |
|   | b. clear CTS timer |
|   | c. adjust BACKOFF - MAX if necessary |
| 4 | a. CTS timer timeout |
|   | b. set BACKOFF-MAX = 2 * BACKOFF-MAX |
|   | c. set BACKOFF timer = random (BACKOFF-MAX) |
| 5 | a. BACKOFF timer timeout |
| 6 | a. receive RTS A,n |
|   | b. send CTS A,n' |
| 7 | a. receive CTS B,n or receive RTS B,n |
|   | b. clear IB timer |
|   | c. set WAIT timer = transmission for n bytes |
| 8 | a. receive CTS A,n' |
|   | b. optional CTS timer adjustment |
|   | c. clear BACKOFF timer |

In Table 1 and FIG. 2, A denotes the name of mobile hosts executing the protocol, and B denotes the name of an arbitrary distinct mobile host in the same cell. It is also assumed that for each state that does not have an explicit timeout transition, an implicit timeout transition to the IDLE state exists. In particular, both the SDATA and RDATA states have implicit timeout transitions to the IDLE state, corresponding to the completion of data transfer. The following definitions apply:

a) The function random(T) returns a uniformly random value between O and T inclusive b) IB denotes the initial backoff. This is necessary for randomizing the initial transmission requests from the mobile hosts, thus reducing collision.

c) RW denotes the request window. It represents the time window a base station waits for a transmission request after it announces its readiness. We observe that IB≦RW.

d) RTS and CTS are respectively the abbreviations for Request To Send and Clear To Send. Before data can be sent in either direction, a RTS-CTS exchange is required.

A short description of the protocol and method now follows.

In Label 1, a mobile station receives a READY announcement and the initial backoff (IB) timer is set to a random number based on the Request Window.

In Label 2, the initial backoff timer now times out and the mobile station sends the Request To Send announcement, and then the Clear To Send timer is set.

In Label 3, the mobile station receives the Clear To Send announcement from the base station and the Clear to Send timer is cleared. The BACKOFF-MAX value is adjusted, if necessary.

In Label 4, the Clear To Send timer times out and the BACKOFF timer is set to a random number based on the BACKOFF-MAX.

In Label 5, the BACKOFF timer times out.

In Label 6, the mobile station receives a Request To Send and then sends a Clear To Send announcement.

In Label 7, the mobile station receives a Clear To Send for another mobile station or receives a Request To Send announcement. It then clears the IB timer and sets the WAIT timer to the announced transmission time.

In Label 8, the mobile station receives a Clear To Send. It clears the BACKOFF timer and optionally adjusts the Clear To Send timer.

Figure 3:
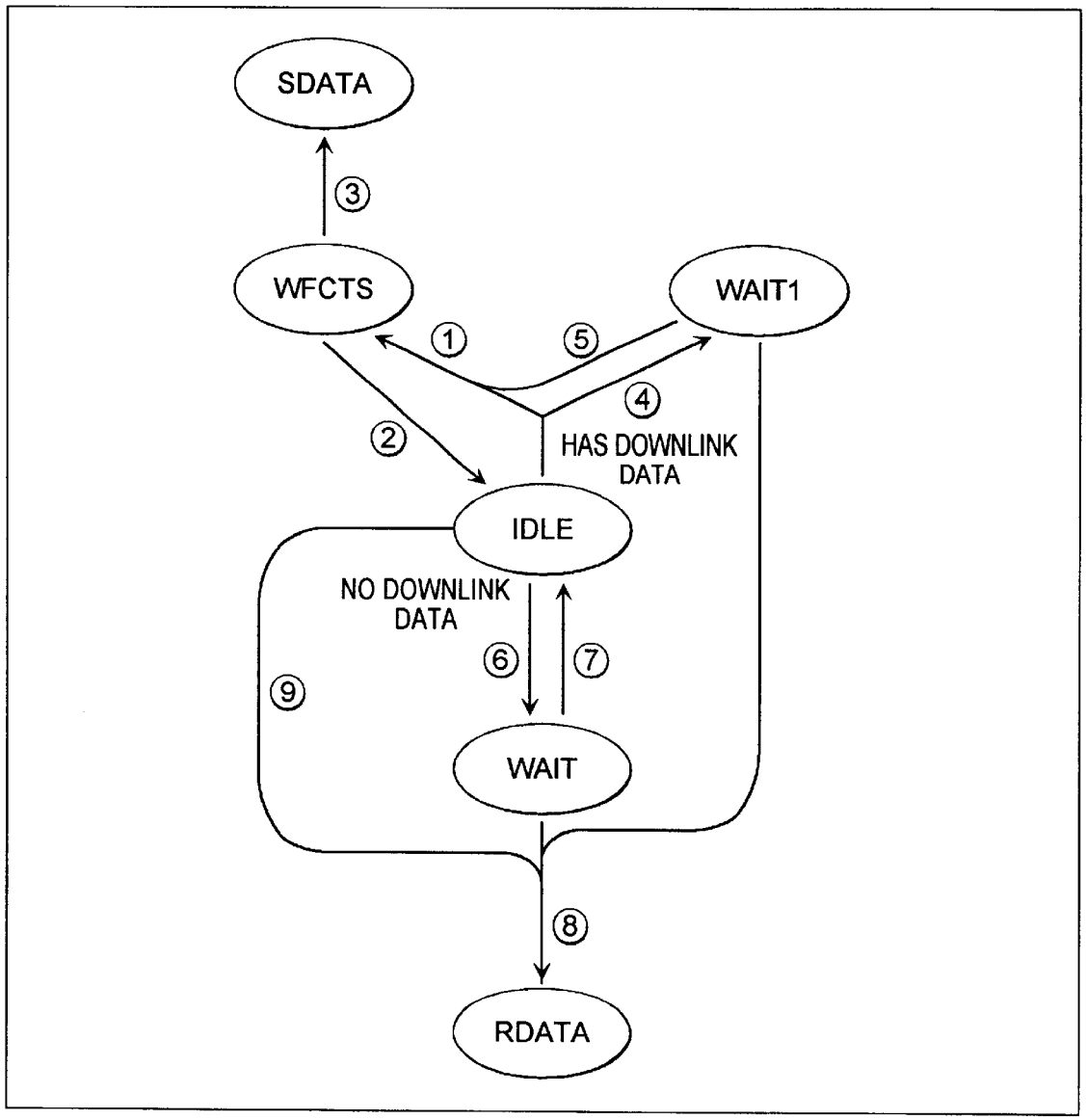
FIG. 3 shows a state diagram for the operation of a base station in accordance with the present invention.

Referring now to Table 2 and FIG. 3, there is represented the protocol for the method and system of the present invention regarding the base station.

TABLE 2

Base Station Protocol Transitions

| Label | Actions |
|---|---|
| 1 | a. send RTS A,n |
|   | b. set CTS timer |
| 2 | a. CTS timer timeout |
|   | b. optional link layer processing |
| 3 | a. receive CTS A,n' |
|   | b. clear CTS timer |
| 4 | a. send READY |
|   | b. set RW timer |
| 5 | a. RW timer timeout |
| 6 | a. send READY |
|   | b. set RW timer |
| 7 | a. RW timer timeout |
| 8 | a. receive RTS A,n |
|   | b. send CTS A,n' |
| 9 | a. adjust RW timer |

The following details apply:

a) Since the downlink channel is collision-free, a message sent downlink should be received by all mobile stations in the cell. The only exceptions are (1) the message is corrupted; (2) the mobile station is off; or (3) the mobile station has left the cell. Thus, when transition 2a is activated, indicating the occurrence of one of these exceptions, the link layer should be notified for exception handling, which could be retry, de-registration, etc.

b) RW should be set to some multiples of the roundtrip transmission time, RTT. In particular, we must have $$RTT \leq RW$$

c) Transitions 1 and 4 represent a non-deterministic choice. That is, when a base station is in the IDLE state and has downlink data to send, it selects randomly either transition 1 or 4 to take. By varying the probability assigned to each transition, the transmission priority between the mobile stations and the base station can be changed. For example, if the probability of taking either transition is 0.5, then both the mobile stations and the base station has equal priority in sending their data.

The base station-side protocol is much simpler and there is little problem with the downlink from the base station to the mobile stations. It is not a multiple access system.

In Label 1, a Request To Send is sent to the mobile station and a Clear To Send timer is then set.

In Label 2, the Clear To Send timer times out and optional link layer processing occurs.

In Label 3, the Clear To Send announcement is received and the Clear To Send timer is cleared.

In Label 4, the READY announcement is sent and the Request Window timer is set.

In Label 5, the Request Window timer times out.

In Label 6, the READY announcement is sent and the Request Window timer is set.

In Label 7, the Request Window timer times out.

In Label 8, the Request To Send is received and the Clear to Send is sent.

In Label 9, the Request Window timer is adjusted.

It is evident that the method and system of the present invention using this type of protocol prevents collision of messages on the uplink to the base station 22 because random time numbers are generated and applied so that the base station grants to the first transmission request it receives and announces the result on the downlink channel. If any mobile stations' transmission requests are not accepted, these mobile stations then backoff for the duration of the transmission. The cycle repeats until the messaging is complete.

Other aspects of the invention can also be accomplished. For example, certain control messages, e.g., an acknowledgement (ACK) message can signal the completion of data transfer, thus enhancing the protocol. Error control possibly could be considered. Because of wireless links, a media access protocol must incorporate some mechanism for error detection and correction. The use of forward error correction is particularly desirable.

Redundancy also could be introduced to improve the reliability of the wireless link. In a wireless environment, one way to achieve redundancy is to install multiple base stations in the same cell. Thus, multiple copies of a message broadcast by a mobile host are received by the network and can be suitably "combined" to recover the original message.

Additionally, the media-access layer can work closely with a link layer. Measurements or statistics obtained in the media-access layer can provide useful feedback for the operation of the link layer.

It should be understood that the above description is only one preferred embodiment of the invention. Numerous other arrangements may be devised by one skilled in the art without departing from the spirit of the invention.

That which is claimed is:

1. A method of half-duplex wireless communication comprising the steps of:

transmitting from a base station to a plurality of mobile stations contained within one wireless communication cell that is serviced by the base station a Ready announcement indicating that the base station is ready to receive data on an uplink channel from the mobile stations, setting a random initial backoff time for each mobile station and transmitting from each mobile station a Request to Send announcement to the base station following expiration of the backoff time, transmitting from the base station to the mobile stations a Clear to Send announcement indicating that the first mobile station to have had its Request to Send announcement received in the base station can now transmit data, resubmitting the Request to Send announcements from the other mobile stations after a predetermined backoff time period has expired corresponding to a time period in which the first mobile station can transmit its data to the base station, and prioritizing any messages from the mobile stations by setting a higher probability that the base station will be in a receiving state rather than a transmitting state.

2. The method according to claim 1 including the steps of transmitting Clear to Send announcements from the mobile stations to the base station indicating that mobile stations are clear to receive data from the base station, and transmitting the data from the base station to a respective mobile station based on the first Clear to Send announcement received within the base station.

3. A half-duplex wireless communication system comprising a premises having a base station that services a defined communication cell, wherein the base station transmits and receives Request to Send and Clear to Send announcements to and from mobile stations to indicate that the base station can receive and send data, and a plurality of mobile stations that send and receive data after transmitting and receiving Clear to Send and Request to Send announcements to and from the base station based on the respective time period in which the base station has received the Clear to Send and Request to Send announcements from respective mobile stations, and means for prioritizing any messages from the mobile stations by setting a higher probability that a base station will be in a receiving state rather than a transmitting state.

4. The system according to claim 3 wherein a Request to Send and Clear to Send announcement exchange must occur between the base station and mobile station before any data exchange can occur.

5. The system according to claim 3 wherein the base station and a mobile station send and receive an acknowledgement message signalling the completion of data transfer.

* * * * *